United States Patent [19]
Mutter

[11] Patent Number: 5,195,464
[45] Date of Patent: Mar. 23, 1993

[54] ANIMAL LITER STATION

[76] Inventor: Raymond G. Mutter, 4920 N. 1000 E., Brownsburg, Ind.

[21] Appl. No.: 942,428

[22] Filed: Sep. 9, 1992

[51] Int. Cl.⁵ ............................................. A01K 29/00
[52] U.S. Cl. .................................................... 119/165
[58] Field of Search ............... 119/161, 165, 166, 167, 119/168, 169, 170, 17, 19, 103; 220/555, 608, 669, 675

[56] References Cited

U.S. PATENT DOCUMENTS

| | | | |
|---|---|---|---|
| 3,111,932 | 11/1963 | Knutson | 119/165 |
| 3,341,271 | 9/1967 | Nelson | 220/555 X |
| 3,581,977 | 6/1971 | Kirsky | 119/168 X |
| 3,885,523 | 5/1975 | Coleman | 119/19 X |
| 4,711,198 | 12/1987 | Mossbarger | 119/168 |
| 5,042,430 | 8/1991 | Casmira | 119/165 |

Primary Examiner—Gene Mancene
Assistant Examiner—Thomas Price
Attorney, Agent, or Firm—Willian Brinks Olds Hofer Gilson & Lione

[57] ABSTRACT

A sanitary commode facility for animals is presented including an integral tray unit having a rear toilet compartment, a front access compartment, opposing front and rear walls and opposing side walls. The rear compartment is intended to receive therein animal waste-absorbent material and the front compartment is intended to provide an ingress/egress path to and from said rear toilet compartment. The rear wall and rear portions of each side wall are of equal and sufficient height to force an animal to enter and exit the rear toilet compartment only via the front compartment and to confine within the tray unit any particles of the waste-absorbent material that may be scattered by the animal during use of the commode facility. The front compartment includes a recessed portion and a grate disposed above the recessed portion for dislodging, when the animal is exiting the rear toilet compartment, particles of animal waste-absorbent material temporarily clinging to the animal and allowing such particles to drop therethrough into the recessed portion for collection and subsequent removal.

22 Claims, 3 Drawing Sheets

ANIMAL LITER STATION

FIELD OF THE INVENTION

This invention relates to a sanitary commode facility for domestic animals and, more particularly, relates to an integral station unit for sanitarily housing and confining animal waste-absorbent material.

BACKGROUND OF THE INVENTION

The use of sanitary facilities for housing animal waste-absorbent material ("litter") is widespread and makes owning a household pet more convenient. Containers housing litter material, commonly referred to as a "litter box," traditionally have been used for collecting the animal waste deposited therein by pets, typically cats, while confined indoors. Such containers, however, are often unsightly and unsanitary because of the scattering of the litter by the animal using the box. A cat, for example, instinctively buries its waste in the litter in such a way that frequently results in litter material, some of it contaminated with waste, being scattered outside of the box onto the surrounding floor or carpet. Moreover, litter particles often cling to the paws of the animal and drop off once the animal exits the box, thereby further adding to the scattered litter material surrounding the box. This creates both an unsightly and unsanitary condition which can result in discoloration of the surrounding tiled or carpeted floor surface, thereby necessitating the expensive replacement of the discolored tile or carpet. The scattering of the litter particles also creates a continuing situation that requires periodic cleaning, a chore often loathed, by the pet owner.

Prior attempts have been made to maintain the litter material within a litter box and are exemplified by U.S. Pat. Nos. 2,741,223; 3,581,977; 3,885,523; 4,838,202; 4,949,673; and 5,042,430. There still remains a need, however, for an easy-maintenance apparatus for effectively containing litter particles scattered by an animal and for effectively removing from the animal's paws and collecting the litter particles that may otherwise drop from the animal while exiting the box.

SUMMARY OF THE INVENTION

The invention provides a sanitary commode facility for use by animals, typically household pets such as cats. The novel commode facility comprises an integral tray unit having a rear toilet area, a front area defining an access path to the rear toilet area, opposing front and rear walls, a floor or bottom wall, and opposing side walls. The floor of the tray unit can further include a partition wall extending between the opposing side walls and partially upwardly from the floor to divide the tray unit into a front recessed portion or compartment and a rear recessed portion or compartment. The rear toilet compartment is intended to receive therein animal waste-absorbent material (granular kitty litter) for sanitarily receiving an animal's excrements.

The rear wall of the tray unit and rear portions of each opposing side wall are of equal and sufficient height to prevent an animal from leaping thereover, thereby forcing the animal to enter and exit the rear toilet area only via the front access path, and to further confine any litter particles within the tray unit and prevent them from escaping onto the surrounding floor surfaces. The front wall and forward portions of each opposing side wall are of a height shorter than that of their corresponding counterparts to provide an access path to the rear toilet area.

The front compartment preferably includes a grate disposed above the recessed portion, so that when an animal exits the rear toilet compartment through the front compartment over the grate, any litter particles temporarily clinging to the animal's feet are dislodged by the grate and drop through the grate into the recessed portion below for collection and subsequent removal. The front compartment also includes a shoulder extending along the interior sides of the front wall, the forward portions of each side wall, and a forward-facing side of the central partition, for supporting the grate about its outer edges above the recessed floor. The front compartment additionally includes means for detachably securing the grate in a horizontal position above the recessed area of the front tray portion defined by at least one engagement nub arranged about the shoulder for frictionally interfitting and securing the grate.

The litter material arranged in the rear toilet compartment of the tray unit may be carried directly in the tray unit or may be contained in a separate litter box which, in turn, can be arranged within the rear compartment.

This invention provides a simple, effective and inexpensive apparatus for retaining and preventing the scattering of waste-absorbent litter material from a litter container during normal use by domestic animals.

DETAILED DESCRIPTION OF THE PREFERRED EMBODIMENT

Figure 1:
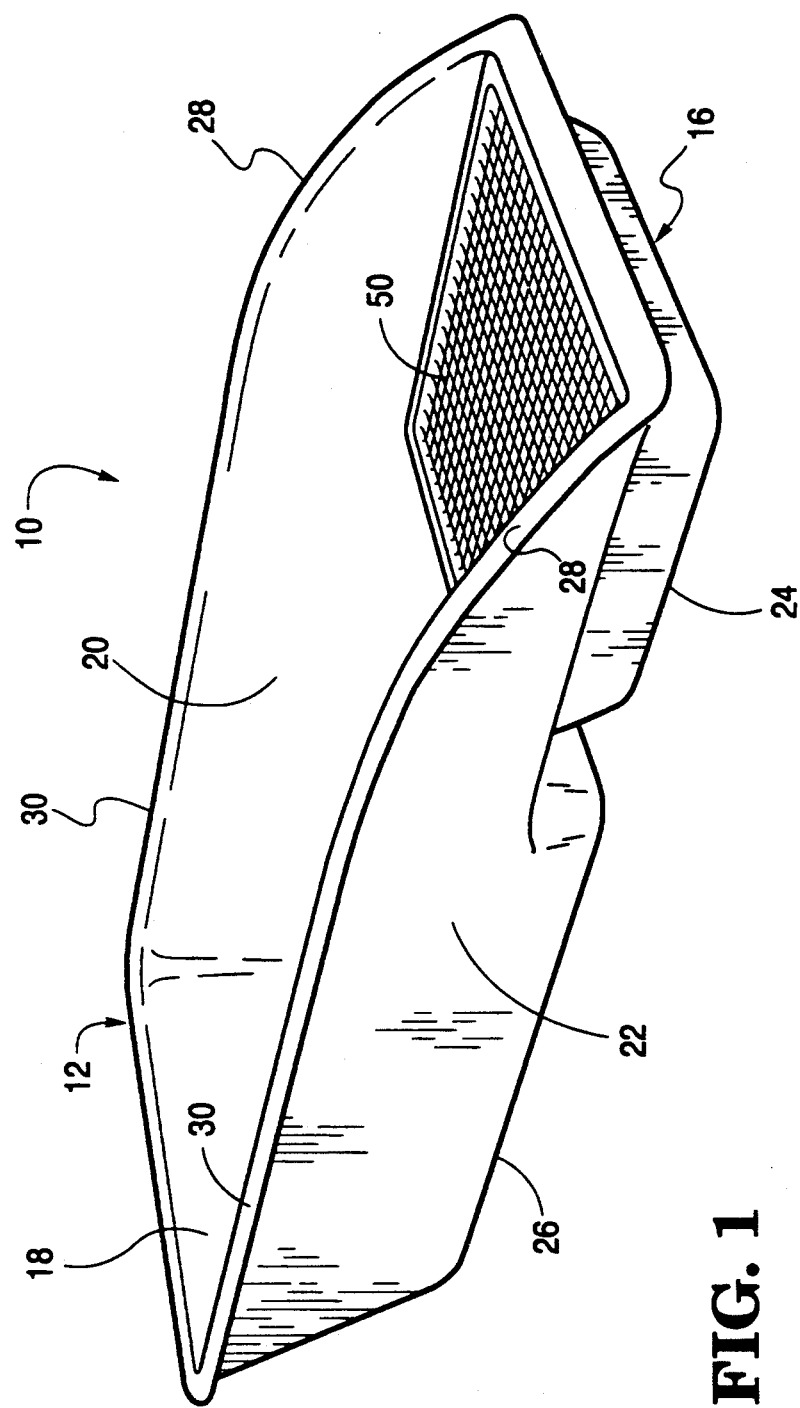
FIG. 1 is a perspective view of an animal litter station embodying the present invention.
Figure 2:
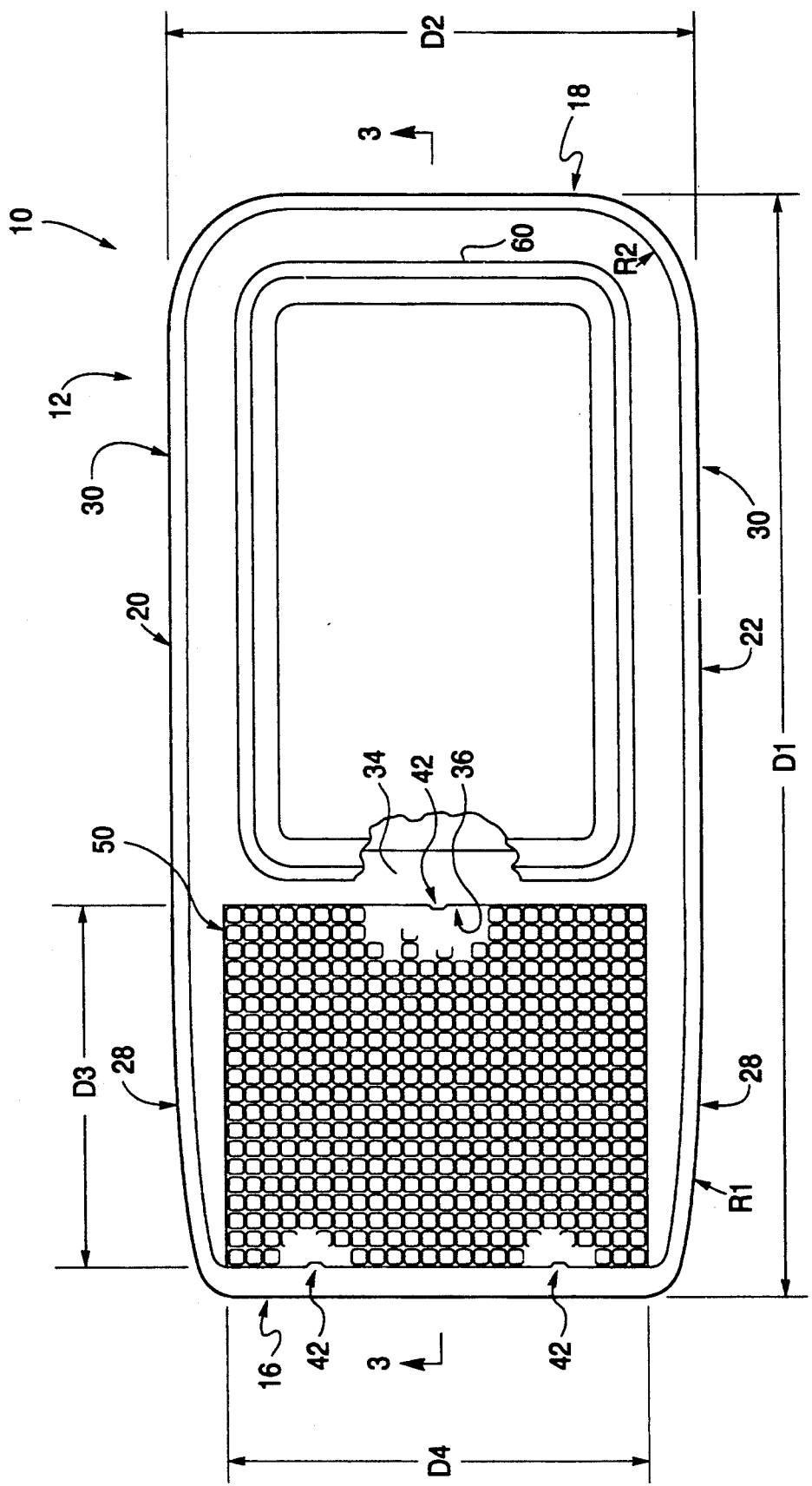
FIG. 2 is a top plan view of an animal litter station embodying the present invention showing a conventional litter box housed therein.
Figure 3:
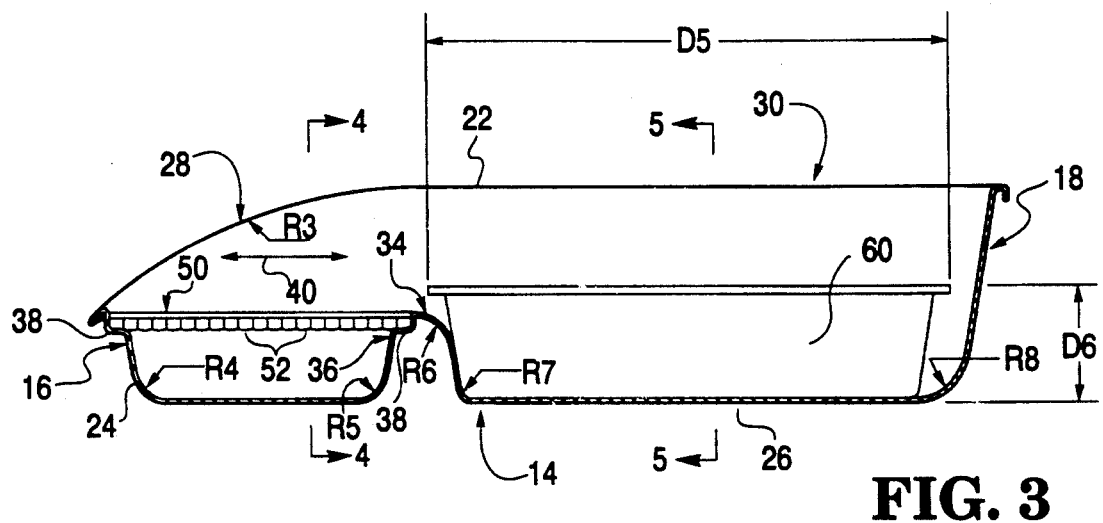
FIG. 3 is a cross-sectional side view of the litter station of FIG. 2 taken along the line 3—3.
Figure 4:
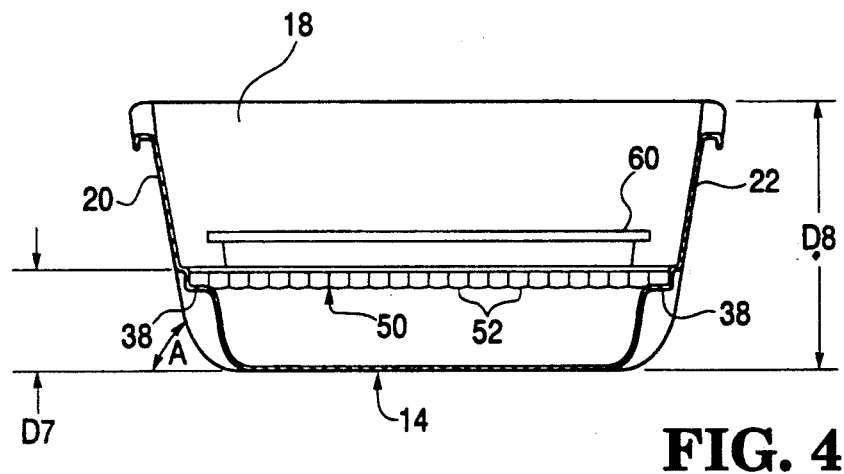
FIG. 4 is a cross-sectional front view of the litter station of FIG. 3 taken along the line 4—4.
Figure 5:
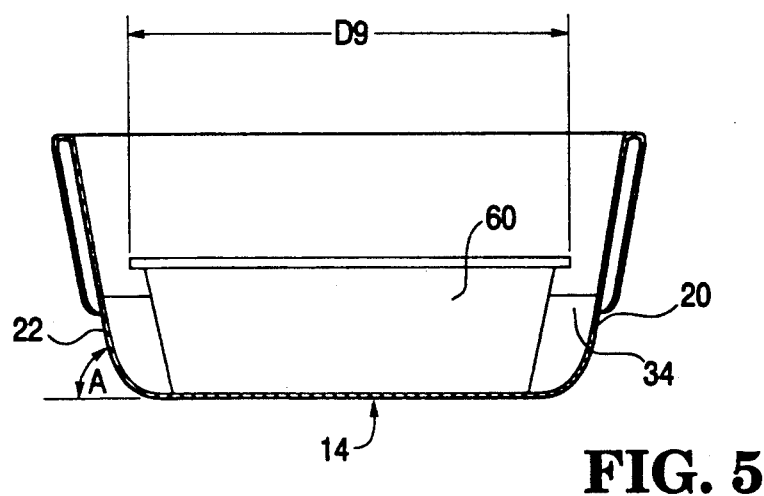
FIG. 5 is a cross-sectional rear view of the litter station of FIG. 3 taken along the line 5—5.

Referring now to FIGS. 1-5, a sanitary commode or toilet facility 10 provided by this invention comprises an integral dual-compartment, open-top tray unit 12 having a floor or bottom wall 14, a front wall 16, a rear wall 18, and two opposing side walls 20, 22. As best seen in FIG. 3, tray unit 12 can further include a partition wall 34 disposed in the floor 14 and extending between the opposing side walls 20, 22 and partially upwardly from the floor 14, thereby dividing the tray unit 12 into a front recessed portion or compartment 24 and a rear recessed portion or compartment 26.

Each of the side walls 20, 22 has a first forward portion or segment 28 (FIGS. 2 and 3) adjacent the front wall 16 and the front compartment 24, and a second rear portion or segment 30 adjacent the rear wall 18 and the rear compartment 26. The rear portions 30 of sidewalls 20, 22, which are equal in height to the rear wall 18, are taller than their respective forward portions 28. The forwardmost part of each forward portion 28 is preferably equal in height to the front wall 16 as shown best in FIG. 3. The shorter front wall 16 and the shorter forward portions 30 of the sidewalls 20, 22 collectively define an ingress/egress path 40 to and from the rear toilet compartment 26, while the taller rear wall 18 and the taller rear portions 30 of the side walls 20, 22 prevent an animal from jumping thereover and force the animal to enter and exit the tray unit 12 only via the path 40 over the recessed portion of the front compartment 24. The taller rear wall 18 and the taller rear portions 30 of the side walls 20, 22 further cooperate to substantially confine the litter material scattered by the animal during use of the rear toilet compartment 26 within the tray unit 12.

The rear toilet compartment 26 can receive the animal litter directly or in an open-top, box-like structure such as a litter box 60 which, in turn, contains the litter material. If desired, a plastic or paper sack or bag may be used to line the recessed portion of the rear compartment or the box 60 prior to litter material being placed therein.

The front compartment 24 is adapted to collect therein any litter particles that may be temporarily clinging to an animal and tracked out of the rear toilet compartment 26 by the animal during its exit via the access path 40. If desired, a grid or grate member 50 can be removably arranged within the front compartment 24 at a selected height above the floor 14 to dislodge any litter particles clinging to the animal's feet or paws when exiting the rear toilet area. Grid member 50 is preferably provided with a plurality of openings 52 ($\frac{3}{8}$" to $\frac{1}{2}$" square) for allowing litter particles carried by the animal and dislodged by the grid member 50 to drop through the openings 52 into the recessed portion of the front compartment 24 for collection and subsequent removal. If desired, a deodorizing agent or air-freshening article may be arranged within the front compartment 24.

The tray unit 12 is appropriately dimensioned such that an animal defecating or urinating in the litter box 60 optionally carried within the rear toilet compartment 26 is prevented from fitting between the litter box 60 and the side walls 20, 22 and rear wall 18 so that the animal is forced to arrange itself within the litter box 60 while using the commode facility. In the use of this invention, whether the litter material is contained directly in the rear compartment 26 or within the litter box 60, any litter particles scattered from the rear toilet area by the animal during use are retained within the tray unit 12 by the front, rear and side walls of the tray.

The front compartment 24 and a forward-facing portion 36 of the partition wall 34 can include a shoulder 38 circumscribing the recessed portion of the front compartment 24 for supporting the grid member 50 about its outer edges above the floor 14. Shoulder 38 extends along the interior sides of the front wall 16, the first or forward segments 28 of the side walls 20, 22 and the forward-facing portion 36 of central partition 34, thereby essentially circumscribing the recessed area of the front compartment 24. The shoulder 38 can include at least one engagement nub 42 (FIG. 2) for frictionally and removably securing the grid member 50 about its outer edges upon the shoulder 38.

The tray unit 12 is preferably constructed of a vacuum-formed thermoplastic resin such as polypropylene. Other similar thermoplastic resins, however, may be suitable for use in the construction of tray unit 12. The material constructing the tray unit is preferably about $\frac{1}{8}$ inches in thickness. An advantage of the litter station 10 provided by this invention is that it may be readily cleaned by simply rinsing the tray with water. The grate member 50 is preferably constructed of a mold-injected thermoplastic synthetic organic polymer such as acrylic. Again, while acrylic is the preferred material, other similar synthetic organic polymers may prove suitable for use with this invention.

In the manufacture of the litter station of this invention, the following dimensions referred to in the Figures and listed below in Table One are preferred:

TABLE ONE

| Dimension | Value (inches) |
| --- | --- |
| D1 | 35.00 |
| D2 | 18.25 |
| D3 | 11.38 |
| D4 | 14.25 |
| D5 | 20.25 |
| D6 | 4.00 |
| D7 | 3.00 |
| D8 | 8.00 |
| D9 | 13.75 |
| Radius | |
| R1 | 44.00 |
| R2 | 2.00 |
| R3 | 15.00 |
| R4 | 1.25 |
| R5 | 1.25 |
| R6 | 1.27 |
| R7 | 0.38 |
| R8 | 2.00 |
| Angle | Degrees |
| A | 15 |

While what has been described constitutes a presently most preferred embodiment, the invention can take many other forms. Accordingly, it should be understood that the invention is to be limited only insofar as is required by the scope of the following claims.

I claim:

1. A sanitary commode for use by animals, comprising:

an integral tray unit having a bottom wall, a front wall, a rear wall taller than said front wall, and two opposing side walls, said bottom wall having a first recessed portion and a second recessed portion, means arranged within the first recessed portion for dislodging animal waste and absorbent material carried by the animal, each said side wall having a forward portion adjacent said first recessed portion and a rear portion adjacent said second recessed portion, said rear portion of each said side wall being taller than said forward portion, said shorter front wall and the shorter forward portions of each said side wall defining an ingress/egress path to and from said second recessed portion, said second recessed portion being adapted for receiving animal waste-absorbent material therein, said taller rear wall and said taller rear portions of each said side wall substantially confining within the tray unit animal waste-absorbent material scattered by the animal during use of said commode.

2. The animal commode as in claim 1 wherein said first recessed portion is adapted to collect therein animal waste-absorbent material tracked out of the second recessed portion by the animal during its exit therefrom.

3. The animal commode as in claim 1 wherein said dislodging means comprises a grid member removably arranged within the first recessed portion for dislodging particles of the animal waste-absorbent material carried by the animal's feet when exiting the second recessed portion.

4. The animal commode as in claim 1 wherein said taller rear wall and said taller rear portions of each said side wall force the animal to enter and exit the tray unit over said first recessed portion.

5. The animal commode as in claim 1 wherein the animal waste-absorbent material is contained in an open-top, box-like structure which, in turn, is arranged within the second recessed portion of said tray unit.

6. The animal commode as in claim 5 wherein said commode is dimensioned such that the animal defecating or urinating in the box-like structure is substantially prevented from fitting between the box-like structure and the side and rear walls of said tray unit, thereby causing the animal to arrange itself within the box-like structure while using said commode.

7. The animal commode as in claim 1 wherein the animal is a cat and the animal waste-absorbent material is loose, granular kitty litter.

8. An animal litter collection article comprising:
a dual-compartment, open-top tray unit having a rear compartment defining a toilet area and a forward compartment defining an ingress/egress path to and from said rear toilet area, a front wall, a bottom wall, a rear wall and opposing side walls, each said side wall having a first segment adjacent the front wall and a second segment adjacent the rear wall, said tray unit further having a particle dislodger positioned within said front compartment for dislodging particles of litter material clinging to the animal,
said rear compartment being adapted for receiving litter material therein for sanitarily receiving animal excrement,
said rear wall and the second segments of each said side wall being of a sufficient height to prevent the animal from leaping thereover, thereby forcing the animal to enter and exit the rear toilet area by passing through said front compartment, said front, rear and side walls of said tray unit being adapted to retain within the tray unit andy litter scattered from the toilet area by the animal during use of said article.

9. The animal litter collection article as in claim 8 wherein any litter material clinging to the feet of the animal when exiting the rear toilet area drops into the front compartment.

10. The animal litter collection article as in claim 9 wherein said particle dislodger, comprises a grid positioned within said front compartment a selected height above the floor thereof, said grid providing a plurality of openings to permit particles of said litter material clinging to the animal, when the animal is passing through the front compartment, to drop through the grid to the floor of said front compartment for collection and subsequent removal.

11. The animal litter collection article as in claim 10 wherein said tray unit further includes a partition wall extending between the opposing side walls and upwardly from the floor of said tray unit partially up said side walls, said partition wall dividing the tray unit into said front and rear compartments.

12. The animal litter collection article as in claim 11 wherein the front compartment and a forward facing portion of the partition wall include a shoulder circumscribing said front compartment, said shoulder including at least one engagement hub for frictionally and removably securing the grid about its outer edges above the floor of said front compartment.

13. The animal litter collection apparatus as in claim 8 further comprising an open-top box removably arranged within said rear compartment for carrying said litter material.

14. An integral kitty litter station comprising:
a toilet area for receiving kitty litter;
an ingress/egress area providing access to the toilet area defined by a portion having a grate positioned therein;
a rear wall of a selected height adjacent the rearward side of said toilet area;
a front wall having a height shorter than the rear wall of said tray; and
a pair of opposing side walls each having a first segment adjacent the front wall of said tray and a second segment adjacent the rear wall of said tray, said second segment of each said side wall having a height equal to said rear wall.

15. The integral kitty litter station as in claim 14 wherein each said side wall has a decreasing height, from rear to front, wherein the height of the first segment of each said side wall at its forwardmost edge adjacent the front wall is substantially equal to the height of said front wall, said taller rear wall and second segments of each said side wall preventing a cat from leaping thereover into or out of the toilet area and causing the cat to enter and exit the toilet area only through the ingress/egress area of said station.

16. The integral kitty litter station as in claim 15 wherein the grate positioned in the front portion of said station dislodges any particles of kitty litter temporarily clinging to the paws of the cat when the cat exits the toilet area, and further provides a plurality of openings for allowing the dislodged kitty litter particles to drop through the grate into the front portion of said tray for collection.

17. The integral kitty litter station as in claim 14 wherein said station further includes a central partition extending between said opposing side walls defining a first recessed area within the front ingress/egress portion and a second recessed area within the toilet area, said ingress/egress portion including means for removably securing said grate in a horizontal position a selected height above the recessed area of said ingress/egress portion, which is adapted to collect for subsequent removal kitty litter particles dropping through said grate.

18. The integral kitty litter station as in claim 17 the means for removably securing the grate over the recessed area of said ingress/egress portion includes a shoulder extending along the interior sides of the front wall, the first segments of each said side wall, and a forward-facing side of the central partition, thereby circumscribing the recessed area of said ingress/egress portion, for supporting the grate about its outer edges, and at least one engagement nub arranged about said shoulder for frictionally inter-fitting and securing the grate thereon.

19. The integral kitty litter station as in claim 14 wherein said station is constructed of a vacuum-formed thermoplastic resin.

20. The integral kitty litter station as in claim 19 wherein the thermoplastic resin is defined by polypropylene.

21. The integral kitty litter station as in claim 14 wherein said grate is constructed of a mold-injected thermoplastic synthetic organic polymer.

22. The integral kitty litter station as in claim 21 wherein said thermoplastic synthetic organic polymer is defined by acrylic.

* * * * *

UNITED STATES PATENT AND TRADEMARK OFFICE
CERTIFICATE OF CORRECTION

PATENT NO. : 5,195,464

DATED : March 23, 1993

INVENTOR(S) : Raymond G. Mutter

It is certified that error appears in the above-identified patent and that said Letters Patent is hereby corrected as shown below:

On the title page, item [56]: References Cited, the following information should be added:

| | | | |
|---|---|---|---|
| 2,741,223 | 4/10/56 | Winborn, B. R. Jr. | 119/168 |
| 4,838,202 | 6/13/89 | Neu, Larry R. | 119/1 |
| 4,949,673 | 8/27/91 | Yamamoto, Yoshikazu | 119/1 |

Signed and Sealed this

Twenty-seventh Day of September, 1994

Attest:

BRUCE LEHMAN

*Attesting Officer*   *Commissioner of Patents and Trademarks*